(12) United States Patent
Kato et al.

(10) Patent No.: US 6,295,956 B1
(45) Date of Patent: Oct. 2, 2001

(54) CYLINDER HEAD FOR DIRECT FUEL INJECTED ENGINE

(75) Inventors: Masahiko Kato; Takayuki Sato, both of Shizuoka (JP)

(73) Assignee: Sanshin Kogyo Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/439,492

(22) Filed: Nov. 15, 1999

(30) Foreign Application Priority Data

Nov. 13, 1998 (JP) ..................................... 10-323258

(51) Int. Cl.⁷ ....................................................... F02F 1/36
(52) U.S. Cl. .............................. 123/41.82 R; 123/41.31; 123/193.5; 123/195 HC
(58) Field of Search ..................... 123/41.82 R, 193.5, 123/73 C, 195 HC, 41.31

(56) References Cited

U.S. PATENT DOCUMENTS 4,106,444 * 8/1978 Deutschmann et al. ...... 123/41.82 R
5,983,843 * 11/1999 Suzuki et al. ................. 123/41.82 R

* cited by examiner

Primary Examiner—Tony M. Argenbright
Assistant Examiner—Katrina B. Harris
(74) Attorney, Agent, or Firm—Knobbe, Martens, Olson & Bear, LLP

(57) ABSTRACT

A cylinder head in a direct fuel injected engine includes an improved construction and defines a combustion chamber with other components of the engine. The engine has a fuel injector arranged to spray fuel directly into its combustion chamber and positioned at one side of the cylinder head. The cylinder head has a coolant jacket through which coolant flows. At least one rib of the cylinder head is positioned on a generally opposite side relative to the fuel injector in the coolant jacket.

18 Claims, 8 Drawing Sheets

CYLINDER HEAD FOR DIRECT FUEL INJECTED ENGINE

PRIORITY INFORMATION

This application is based on and claims priority to Japanese Patent Application No. 10-323258 filed Nov. 13, 1998, the entire contents of which is hereby expressly incorporated by reference.

BACKGROUND OF THE INVENTION

1. Field of the Invention

This invention relates to a cylinder head for a direct fuel injected engine, and more particularly to an improved cylinder head in which heat is distributed uniformly therein.

2. Description of Related Art

In all fields of engine design, there is an increasing emphasis on obtaining more effective emission control, better fuel economy and, at the same time, continued high or higher power output. This trend has resulted in the substitution of fuel injection systems for carburetors as the engine charge former. In the common systems conventionally used, fuel is injected into an intake air manifold.

In order to obtain still further improvement, direct injection systems are being considered. These systems inject fuel directly into a combustion chamber and thus have significant potential advantages. With direct fuel injection systems, the fuel must be injected directly into the combustion chamber, and consequently a fuel injector is disposed on a cylinder head that defines the combustion chamber.

When an engine charge is burnt in the combustion chamber, extremely high temperature is generated and conducted to the cylinder head. The cylinder head, therefore, has a water jacket therein to remove the heat promptly. However, because the fuel injector is disposed onto the cylinder head as noted above, it is likely to displace the water jacket in a portion of the cylinder head. The portion of the cylinder head that bears the fuel injector, thus, hold heat more than the other portions. The temperature distribution in the cylinder head thus is not uniform.

The cylinder head encircles a primary portion of the combustion chamber. As a result, the combustion state in the combustion chamber tends to be unstable, i.e., inconsistent. The engine consequently runs rough. This tendency is noticeable if the fuel injector is not positioned directly above the center of the combustion chamber.

SUMMARY OF THE INVENTION

A need therefore exists for a cylinder head of a direct fuel injected engine that is configured to improve uniform temperature distribution within the associated combustion chamber(s) to promote a stable combustion state under all normal operating conditions.

In accordance with one aspect of the present invention, a direct fuel injected, internal combustion engine comprises a cylinder body defining at least one cylinder bore in which a piston reciprocates. A cylinder head is affixed to an end of the cylinder body for closing the cylinder bore and defining, together with the piston and the cylinder bore, a combustion chamber. A fuel injector is arranged to spray fuel directly into the combustion chamber. The cylinder head has a coolant jacket through which coolant flows. The fuel injector is positioned at one side of the cylinder head in the cooling jacket. At least one rib of the cylinder head is disposed generally opposite of the fuel injector. This cooling rib provides enhanced cooling to the side of the cylinder head, and consequently to the side of the combustion chamber opposite of the fuel injector position. In this manner, the cooling effect of the injected fuel on the fuel injector side of the combustion chamber are generally counter-balanced by the cooling effect provided by the rib so as to provide more uniform heat distribution in the combustion chamber, and hence, a more stable combustion state.

In accordance with another aspect of the present invention, a direct fuel injected, internal combustion engine comprises a cylinder body defining at least one cylinder bore in which a piston reciprocates. A cylinder head member is affixed to an end of the cylinder body for closing the cylinder bore and defining with the piston and the cylinder bore a combustion chamber. A fuel injector is arranged to spray fuel directly into the combustion chamber. The fuel injector is disposed in an injector boss positioned on the cylinder head member. A cylinder head cover member defines a coolant passage with the cylinder head member therebetween. A plurality of ribs are projected into the coolant passage from the cylinder head member. One of the ribs extends from the injector boss.

Further aspects, features and advantages of the invention will become apparent from the detailed description of the preferred embodiment which follows.

BRIEF DESCRIPTION OF THE DRAWINGS

These and other features of this invention will now be described with reference to the drawings of a preferred embodiment which is intended to illustrate and not to limit the invention. The drawings contain the following figures.

DETAILED DESCRIPTION OF THE PREFERRED EMBODIMENT OF THE INVENTION

The general overall environment in which the invention is practiced and certain details of the engines will be described primarily by reference to FIG. 1 and additionally to FIGS. 2 to 5.

Figure 1:
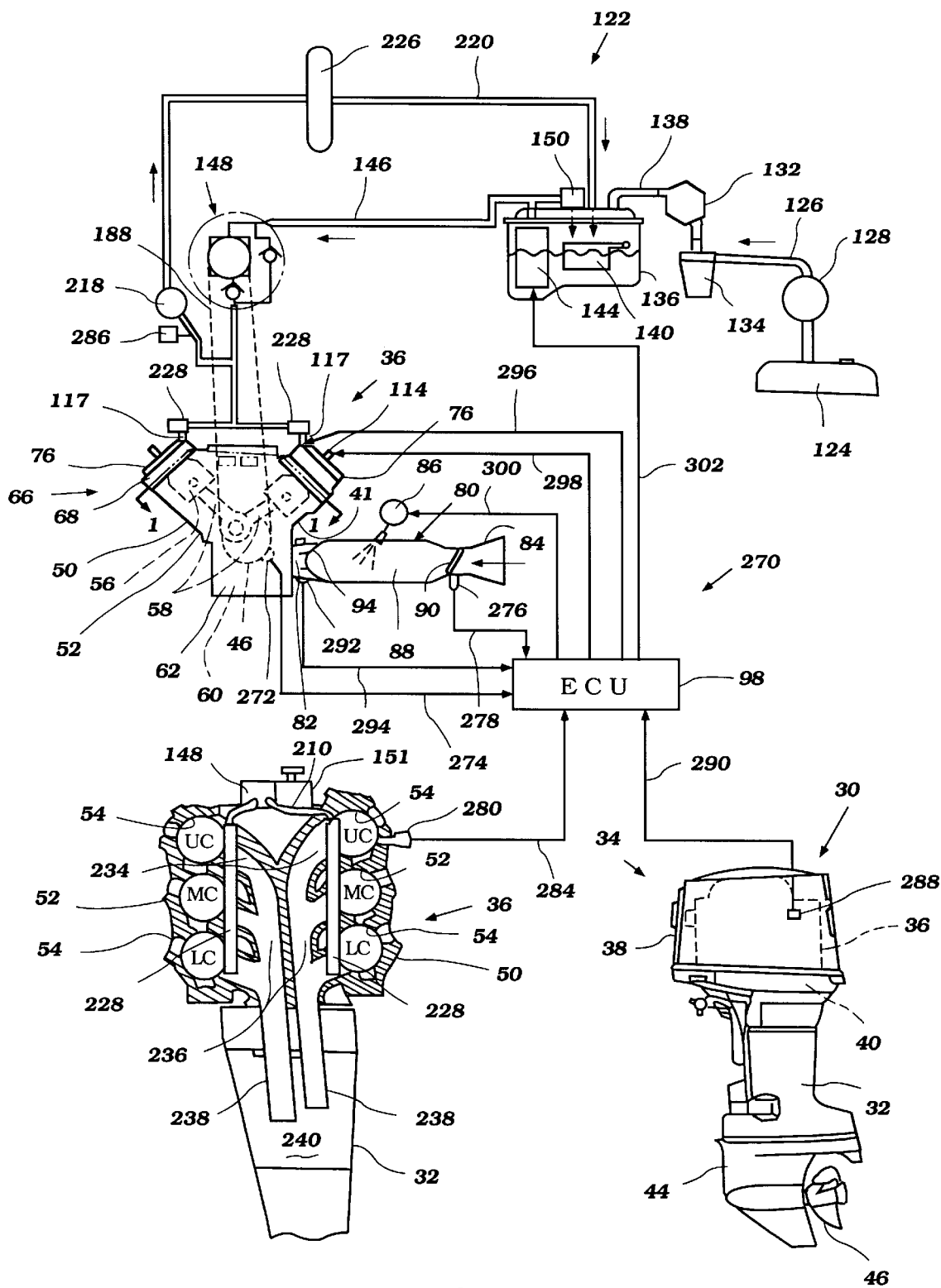
FIG. 1 is a multi-part view showing: in the lower right-hand portion, an outboard motor in accordance with an embodiment of the present invention; in the upper view, a partially schematic cross-sectional view of the engine of the outboard motor with an air induction and fuel injection system; in the lower left-hand portion, a rear elevational view of the outboard motor with portions removed and other portions broken away and shown in section along the line 1—1 in the upper view so as to more clearly show the construction of the engine, and a fuel injection system shown in part schematically. An ECU (Electronic Control Unit) for the motor links the three views together.

In the lower-right hand view of the FIG. 1, an outboard motor constructed and operated in accordance with an embodiment of the present invention is depicted in side elevational view and is identified generally by the reference nuneral 30. In connection with the following description, the terms "front," "forward" and "forwardly" means at or toward the left side of the outboard motor illustrated in the lower right-hand portion of FIG. 1 (i.e., the side on which a clamping bracket would affixed the motor 30 to the transom of an associated watercraft), and the terms "rear" and "rearwardly" mean at or toward an opposite side of the front side unless stated otherwise.

The entire outboard motor 30 is not depicted in that the swivel bracket and clamping bracket, which are associated with the driveshaft housing 32, are not illustrated. These components are well known in the art and the specific method by which the outboard motor 30 is mounted to the transom of an associated watercraft is not necessary to permit those skilled in the art to understand or practice the present engine construction.

The outboard motor 30 includes a power head, indicated generally by the reference numeral 34, that is positioned above the driveshaft housing 32. The powerhead 34 includes a powering internal combustion engine, indicated generally by the reference numeral 36. This engine 36 is shown in more detail in the remaining two views of this figure and will be described shortly by reference thereto.

Figure 2:
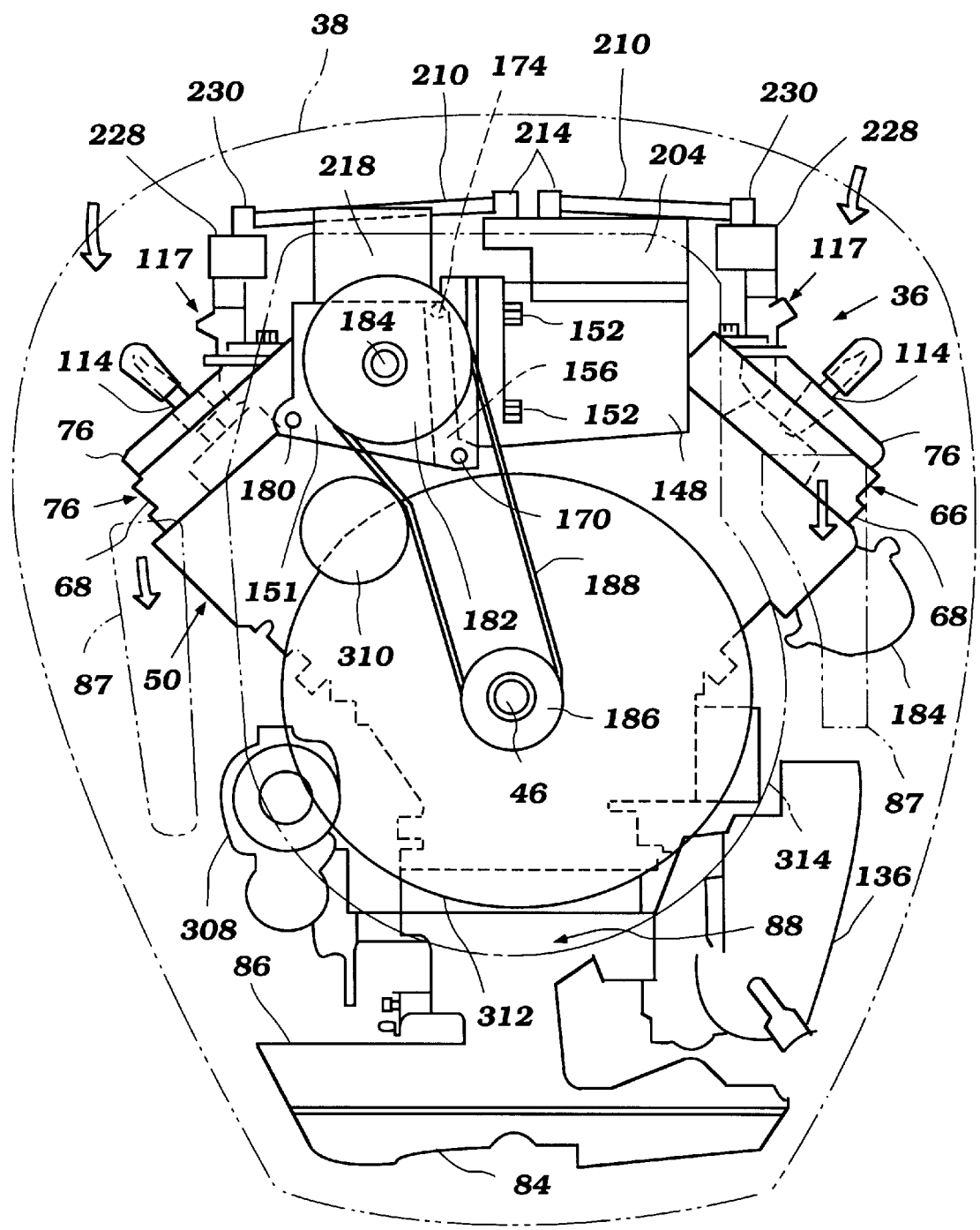
FIG. 2 is a top plan view showing a power head accommodating the engine. The engine is indicated in solid line and a protective cowling enclosing the engine is shown in phantom line.

The power head 34 is completed by a protective cowling which includes a main cowling member 38. This main cowling member 38 is detachably affixed to a lower tray portion 40 of the protective cowling and encloses an upper portion of the driveshaft housing 32. As schematically illustrated by FIG. 2, air is introduced into a pair of air compartments of the cowling 38 through a pair of rearwardly positioned air inlet openings and then admitted into the interior of the protective cowling 38 through air inlet baffles 87 (FIG. 2) disposed at the respective air compartments of the protective cowling 38.

Positioned beneath the driveshaft housing 32 is a lower unit 44 in which a propeller shaft 46 is journaled. The propeller shaft supports and drives a propeller shaft 46, which forms the propulsion device for the associated watercraft.

As is typical with outboard motor practice, the engine 36 is supported in the power head 34 so that its crankshaft 46 (see the upper view) rotates about a vertically extending axis. This is done so as to facilitate the connection of the crankshaft 46 to a driveshaft (not shown) which depends through the driveshaft housing 32 and which drives the propeller 46 through a conventional forward, neutral, reverse transmission contained in the lower unit 44.

The details of the construction of the outboard motor and the components which are not illustrated may be considered to be conventional or of any type known to those wishing to utilize the invention disclosed herein. Those skilled in the art can readily refer to any known constructions with which to practice the invention.

With reference now in detail to the construction of the engine 36 still by primary reference to FIG. 1, in the illustrated embodiment, the engine 36 is of the V6 type and operates on a two stroke, crankcase compression principle. Although the invention is described in conjunction with an engine having this cylinder number and cylinder configuration, it will be readily apparent that the invention can be utilized with engines having other cylinder numbers and other cylinder configurations. Also, although the engine 36 will be described as operating on a two stroke principle, it will also be apparent to those skilled in the art that certain facets of the invention can be employed in conjunction with four stroke engines.

The engine 36 comprises a cylinder body or block 50 that is formed with a pair of cylinder banks 52. Each of these cylinder banks 52 is formed with three vertically spaced, horizontally extending cylinder bores 54 (Cylinder sections are indicated as UC, MC and LC in the lower left-hand portion of FIG. 1). Pistons 56 reciprocate in these cylinder bores 54. The pistons 56 are, in turn, connected to the small ends of connecting rods 58. The big ends of these connecting rods are journaled on the throws of the crankshaft 46 in a manner that is well known in this art.

The crankshaft 46 is journaled in a suitable manner for rotation within a crankcase chamber 60. The crankcase chamber 60 is formed in part by a crankcase member 62 that is affixed to the cylinder block 50 in a suitable manner. As is typical with two cycle engines, the crankshaft 46 and crankcase chamber 60 are formed with seals so that each section of the crankcase that is associated with one of the cylinder bores 54 will be sealed from the others. This type of construction is well known in the art.

Cylinder head assemblies, indicated generally by the reference numeral 66, are affixed to the end of the cylinder banks 52 that are spaced from the crankcase chamber 60. One cylinder head assembly 66 is shown in more detail in FIG. 4 and comprises a cylinder head member 68 that defines a plurality of recesses 70 in its forward face. Each of these recesses 70 cooperates with the respective cylinder bore 54 and the corresponding head of the piston 56 to define the combustion chambers 72 of the engine 36.

A cylinder head cover member 76 completes the cylinder head assembly 66. The cylinder head members 68 and cylinder head cover members 76 are affixed to each other and to the respective cylinder banks 52 in a suitable known manner.

With reference again primarily to FIG. 1, the air induction system, indicated generally by the reference numeral 80, is provided for delivering an air charge to the sections of the crankcase chamber 60 associated with each of the cylinder bores 54. This communication is via an intake port 82 formed in the crankcase member 62 and registering with each such crankcase chamber section. Thus, the upper portion of FIG. 1 schematically illustrates only one cylinder, crankcase chamber, and an associated intake port 82 and induction path. Each cylinder and associated crankcase chamber, however, includes a dedication intake port 82 and intake passage.

The induction system 80 includes an air silencing and inlet device 84, shown schematically in FIG. 1. The actual construction of this air inlet device 84 appears in FIG. 2. This device 84 is contained within the main protective cowling 38 at the forward end thereof and has a rearwardly facing air inlet opening 86 through which air flows into the device 84.

As understood from FIG. 1, the air inlet device 84 supplies the intake air to a plurality of throttle bodies 88, each of which has a throttle valve 90 provided therein. These throttle valves 90 are supported on throttle valve shafts (not shown). Throttle valve shafts are linked together with each other for simultaneous opening and closing of the throttle valves 90 in a manner that is well known in this art.

As is also typical in two cycle engine practice, the intake ports 82 have, provided in them, reed-type check valves 94. Each check valve 94 permit the air to flow into the respective crankcase chamber 60 when the corresponding piston 56 moves toward top-dead-center (TOC) in the respective cylinder bore 54. However, as the pistons 56 move toward bottom-dead-center (BDC), the charge will be compressed in the sections of the crankcase chamber 60. At that time, the reed type check valve 94 will close so as to permit the charge to be compressed.

A lubricant pump 96 is provided for spraying lubricant into the throttle body 88 for engine lubrication under the control of an ECU (Electronic Control Unit), shown schematically in FIG. 1 and identified by the reference numeral 98. Although it is not shown, some forms of direct lubrication may be also employed for delivering lubricant directly to certain components of the engine.

Figure 4:
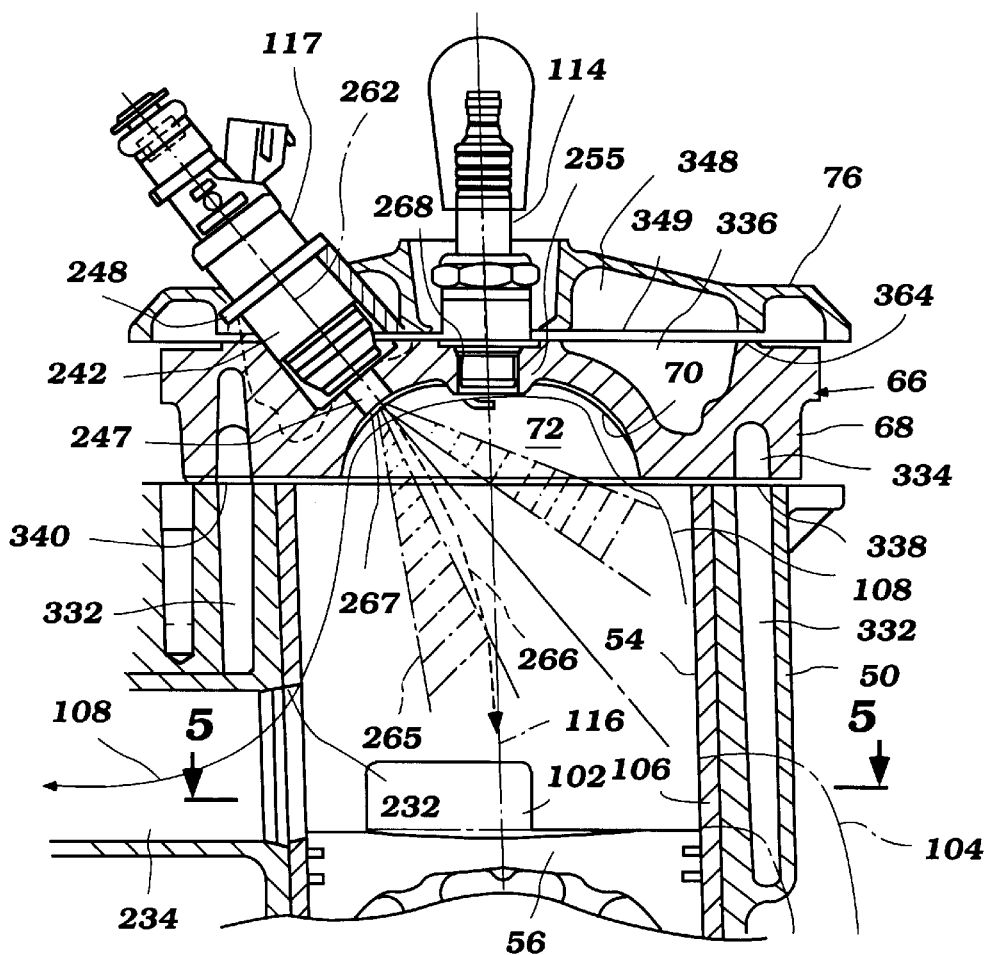
FIG. 4 is an enlarged cross-sectional view taken through a portion of one of the cylinders of the engine in the embodiment of this invention and shows in detail a cooling arrangement of the fuel injector as well as a fuel injection spray pattern with scavenging air flow.
Figure 5:
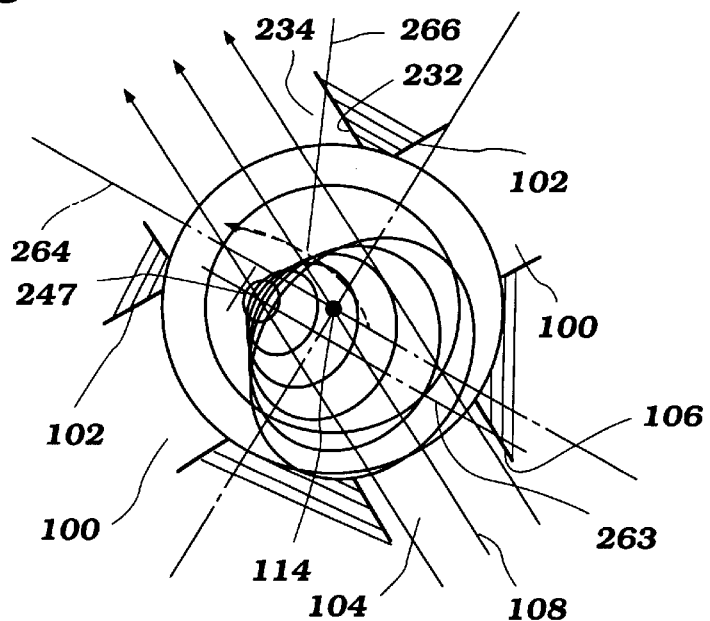
FIG. 5 is a schematic cross-sectional top plan view showing the cylinder taken along the line 5—5 in FIG. 4 and particularly the fuel injection spray pattern and the scavenging air flow therein.

The charge, which is compressed in the sections of the crankcase chamber 60, is then transferred to the combustion chambers 72 as through a scavenging system, is best illustrated in FIGS. 4 and 5. This scavenging system is of the Schedule type and includes a pair of main scavenge passages 100 that are positioned on diametrically opposite sides. These main scavenge passages terminate in main scavenge ports 102 so as to direct scavenge air flows into the combustion chamber 72.

In addition, an auxiliary scavenging passage 104 is formed between the main scavenge passages and terminates in an auxiliary scavenging port 106 which also provides scavenging air flow indicated by the arrows 108. Thus, during the scavenging stroke, the intake charge will be transferred to the combustion chambers 72 for further compression as the pistons 56 move upwardly from their bottom dead center position so as to close the scavenge ports 102 and 106 and further compress the charge.

Although the auxiliary scavenging port 106 is indicated schematically in phantom to extend almost horizontally in FIG. 4, it actually extends slantwise and slightly upwardly to form the scavenging air flow 108 upwardly toward the recess 70 in the cylinder head member 68. The scavenging air flows from the main scavenging port 102 are also directed toward the recess 70. In addition, the main scavenging passages 100 are actually slightly directed toward the opposite side of the auxiliary scavenging passage 104, although they are indicated as completely confronting with each other in FIG. 5.

With continual reference primarily to FIG. 4, a spark plug 114 is mounted in the cylinder head assembly 66 for each cylinder bore 54 and has its own axis on the cylinder bore axis 116. That is, each spark plug 114 is disposed at generally the center portion of the combustion chamber 70. Also, its respective spark gap is disposed substantially on the cylinder bore axis 116 and exposed to the combustion chamber 70. The spark plugs 114 are fired under the control of the ECU 98. The ECU 98 receives certain signals, as will be described, for controlling the time of firing of the spark plugs 114 in accordance with any desired control strategy.

Each spark plug 114, in turn, fires a fuel air charge that is formed from the fuel sprayed by a fuel injector 117 and the air coming through the scavenge ports 102, 104. The fuel injectors 117 are solenoid type and electrically operated also under control of the ECU 98. The fuel injectors 117 are mounted directly in the cylinder head assembly 66 in a specific location, as will be described, so as to provide optimum fuel vaporization under all running conditions.

Fuel is supplied to the fuel injectors 117 by a fuel supply system, indicated generally by the reference numeral 122 (see the upper and lower left hand views of FIG. 1). The fuel supply system 122 comprises a fuel supply tank 124 that is provided in the hull of the watercraft with which the outboard motor 30 is associated. Fuel is drawn from this tank 124 through a conduit 126 by means of a first low pressure pump 128 and a plurality of second low pressure pumps 132. The first low pressure pump 128 is a manually operated pump and the second low pressure pumps 132 are diaphragm type pumps operated by variations in pressure in the sections of the crankcase chamber 60, and thus provide a relatively low pressure. A quick disconnect coupling is provided in the conduit 126 and also a fuel filter 134 is positioned in the conduit 126 at an appropriate location.

From the second low pressure pump 132, fuel is supplied to a vapor separator 136 which is mounted on the engine 36 or within the protective cowling 38 at an appropriate location. This fuel is supplied through a line 138. At the end of the line 138 and in the vapor separator 136, there is provided a float valve that is operated by a float 140 so as to maintain a uniform level of fuel in the vapor separator 136.

A high pressure electric fuel pump 144 is provided in the vapor separator 136 and pressurizes fuel that is delivered through a fuel supply line 146 to a high pressure fuel pump, indicated generally by the reference numeral 148. The electric fuel pump 144, which is driven by an electric motor, develops a pressure such as 3 to 10 kg/cm$^2$. A low pressure regulator 150 is positioned in the line 146 at the vapor separator 136 and limits the pressure that is delivered to the high pressure fuel pump 148 by dumping the fuel back to the vapor separator 136. The high pressure fuel pump 148 that can develop a pressure of, for example, 50 to 100 kg/cm$^2$ or more. A pump drive unit 151 is provided for driving the high pressure fuel pump 148.

Figure 3:
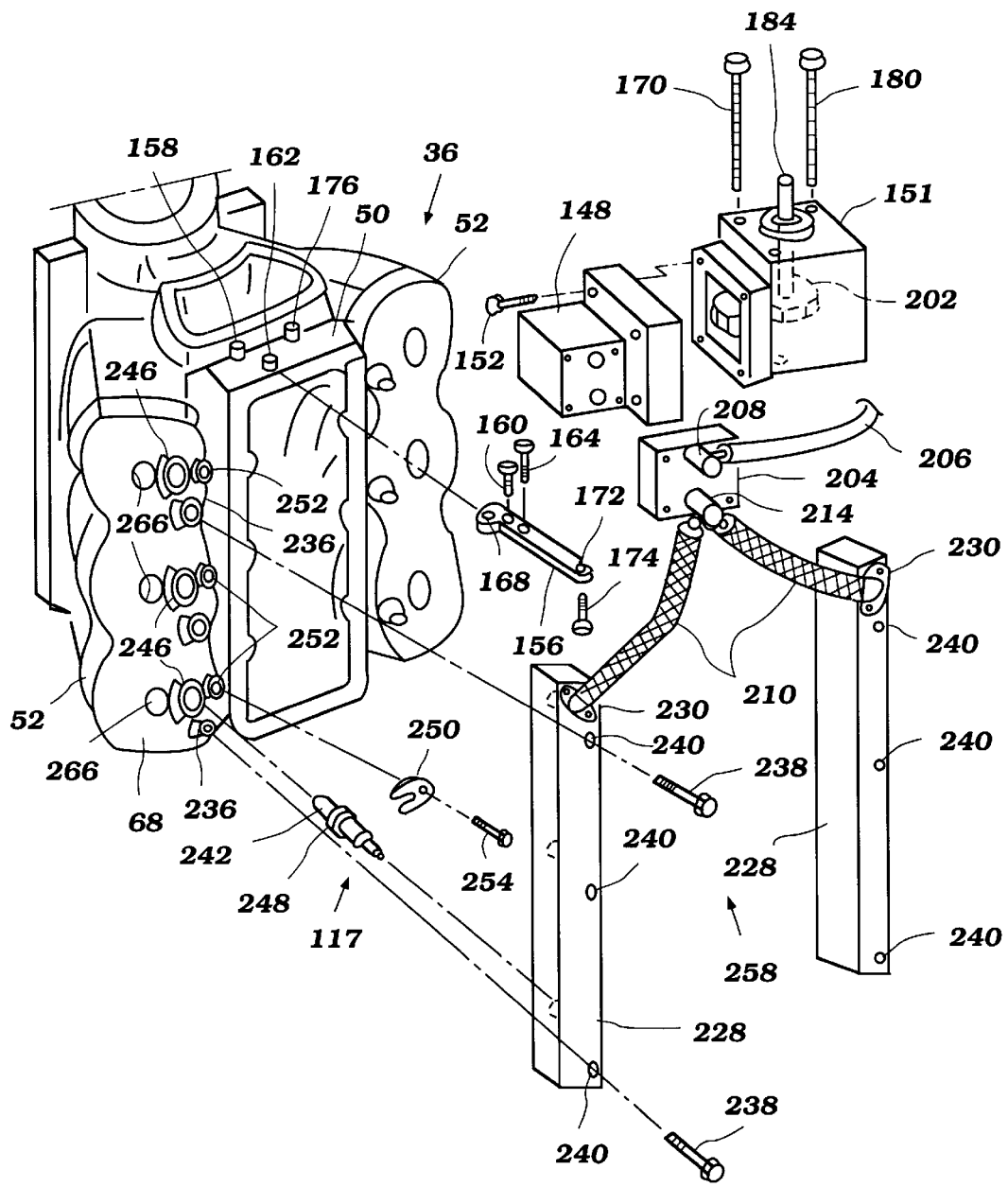
FIG. 3 is a perspective view showing a portion of the engine. Components of the fuel injection system are exploded from the engine.

As seen in FIGS. 2 and 3, the high pressure fuel pump 148 is mounted on the pump drive unit 151 with bolts 152. A stay 156 is affixed to the cylinder block 50 at a boss 158 with a bolt 160 and at another boss 162 with a bolt 164. The pump drive unit 151 is affixed to the stay 156 at a bolt hole 168 with a bolt 170 and at another bolt hole 172 with a bolt 174. The pump drive unit 151 is further affixed to the cylinder block 50 directly at a boss 176 with a bolt 180. Thus, the pump drive unit 151 overhangs between the two cylinder banks 52 of the V arrangement. A pulley 182 is affixed to a pump drive shaft 184 of the pump drive unit 151. The pulley 182 is driven by a drive pulley 186 affixed to the crankshaft 46 by means of a drive belt 188. The pump drive shaft 184 is provided with a cam disc 202 existing horizontally for pushing plungers (not shown) which are disposed on the high pressure fuel pump 148.

The high pressure fuel pump 148 has a unified fuel inlet and outlet module 204 which is mounted on a side wall of the pressure pump 148. The inlet and outlet module 204 has an inlet passage (not shown) connected to the fuel supply line 206 with a connector 208, while an outlet passage (not shown) is connected to a pair of flexible conduits 210 with a connector 214.

As seen in FIG. 1, the pressure of the fuel supplied by the high pressure fuel pump 148 is regulated to be the fixed value by a high pressure regulator 218 which dumps fuel back to the vapor separator 136 through a pressure relief line 220 in which a fuel heat exchanger or cooler 226 is provided. It is important to keep the fuel under the constant pressure because the fuel amounts are determined by changes of duration of injection under the condition that the pressure for injection is always the same.

The flexible conduits 210, as seen in FIGS. 2 and 3, are connected to fuel supply rails 228 with connectors 230. The fuel supply rails 228 are made of metal so as to be rigid. The fuel supply rails 228 communicate with the flexible conduits 210 and also with the fuel injectors 117 when they are coupled to the fuel supply rails 228.

The respective fuel rails 228 are affixed to both of the cylinder head members 68 at bosses 236 with positioning bolts 238. Apertures 240 are provided on the fuel rails 228 for the positioning bolts 238 passing therethrough. The fuel injectors 117 are held between the fuel supply rails 228 and the cylinder head members 68. Mount sections 242 of the fuel injectors 117 are inserted into injector bosses 246 so that injector nozzles 247 (see FIG. 4) are exposed to the combustion chambers 72. Flange portions 248 of the fuel injectors 117 are supported with forked members 250 that are affixed to the cylinder head member 68 at bosses 252 with bolts 254. The forked member 250 desirably is made of anti-corrosive metal such as, for example, stainless steel and aluminum, or of synthetic resin.

The spark plugs 114 are affixed to plug bosses 255 (see FIG. 4) which have threaded openings 268. Each axis of the plug boss 255 is consistent with the center axis 116 of the cylinder bore 54 so that the spark plugs 114 extends straight along the center axis 116.

Although the same bosses 236, 246, 252 are provided on the cylinder head member 68 of the other bank 52, they are simply schematically shown in FIG. 3. The high pressure fuel pump 148, pump drive unit 151, inlet and outlet module 204, flexible conduits 210, fuel rails 228 and fuel injectors 117 are unified together. These unified components form a high pressure fuel injection assembly 258.

Fuel is supplied from the high pressure fuel pump 148 to the flexible fuel conduits 210. The fuel conduits 210, in turn, deliver fuel to a pair of vertically extending fuel rails 228. The fuel rails 228, then, supply fuel to the fuel injectors 117.

As best seen in FIG. 4, each injector boss 246 is positioned at the side where the exhaust port 232 is disposed and has an axis 262 extending slantwise (i.e., skewed) relative to the center axis 116 of the cylinder bore 54. Since the fuel injector 117 is disposed in the boss 246, it also is inclined relative to the center axis 116. Also, as seen in FIG. 5, the injector nozzle 247 is positioned on a line 263 that is not consistent with a line 264 on which the spark plug 114 exists but extends in parallel to the line 264. Since the spark plug 114 is positioned straight on the axis 116 of the center axis of the cylinder bore 54, the line 264 exactly passes the center of the cylinder bore 54. The line 263, therefore, runs off the center line 264. The injection nozzles 247 and the spark plugs 114 are exposed to the combustion chambers through openings 267 and 268, respectively; however, the spark plug 114 is schematically by a point in FIG. 5.

Each of the fuel injectors 117 sprays fuel into the combustion chamber 72 from its injection nozzle 247. The sprayed fuel expands into the combustion chamber 72 with the spray patterns as shown in FIGS. 4 and 5. The spray pattern in FIG. 4 splits in two directions. This is because the injector nozzle 247 has a pair of small injection apertures thereon that are oriented slightly outwardly relative to the axis 262.

The deviation of the injector nozzle 247 from the center line 264 causes a swirl 266 in the spray of the fuel. This is useful for avoiding particles of the fuel from gathering together by collision and becoming larger.

Because the scavenging air flow 108 in each cylinder bore 54 that comes from the auxiliary scavenge port 106 is directed toward the fuel injector 117, which is disposed in the injector boss 246, the fuel sprayed by this fuel injector 117 is wafted by the scavenging air flow 108 and deprives heat for vaporization from the inner wall portion of the cylinder head member 68 where the fuel injector 117 is positioned. Thus, this wall portion is cooled more than the other portions of the cylinder head member 68 by this effect.

With reference back to FIG. 1, after the fuel charge has been formed in the combustion chambers by the injection of fuel from the fuel injectors 117, the charge is fired by firing the spark plugs 114. The injection timing and duration, as well as the control for the timing of firing of the spark plugs 114, are controlled by the ECU 98.

Once the charge bums and expands, the pistons 56 will be driven downwardly in the cylinder bores 54 until the pistons 56 reach the lowermost position (i.e., 80c). At this time, an exhaust port 232 (see FIG. 4) will be uncovered so as to open communication with an exhaust passage 234 formed in the cylinder block 50. The exhaust gasses flow through the exhaust passages 234 to manifold collector sections 236 (see FIG. 1) of respective exhaust manifolds that are formed within the cylinder block 50.

As seen in FIG. 1, a pair of exhaust pipes 238 depend from the lower tray portion 40, and more specifically, from its exhaust guide plate and extend the exhaust passages 234 into an expansion chamber 240 formed in the driveshaft housing 32. From this expansion chamber 240, the exhaust gasses are discharged to the atmosphere through a suitable exhaust system. As is well known in outboard motor practice, this may include an underwater, high speed exhaust gas discharge and an above the water, low speed exhaust gas discharge. Since these types of systems are well known in the art, a further description of them is not believed to be necessary to permit those skilled in the art to practice the invention.

A feedback control system, indicated generally by the reference numeral 270 is provided for realizing a control strategy along which the initiation and duration of fuel injection from the fuel injector 117 and timing of firing of the spark plugs 114 are controlled. The feedback control system 270 comprises the ECU 98 and a number of sensors which sense either engine running conditions, ambient conditions or conditions of the outboard motor 30 that will affect engine performance. Certain of the sensors are shown schematically in FIG. 1 and will be described by reference to that figure.

There is provided, associated with the crankshaft 46, a crankshaft angle position sensor 272 which, when measuring crankshaft angle versus time, outputs a crankshaft rotational speed signal or engine speed signal via a signal line 274 to the ECU 98.

Operator demand or engine load, as determined by throttle angle of the throttle valve 90, is sensed by a throttle position sensor 276 which outputs a throttle position or load signal via a signal line 278 to the ECU 98. When the operator desires to gather speed, i.e., accelerate the engine operation, a throttle on a steering handle (not shown) is operated by the operator. The throttle valves 90 are, then, opened toward the certain open position that corresponds to the desired speed at which air charge is induced more than before into the crankcase chamber 60 through the throttle bodies 88. Also, the engine load increases, for example, when the associated watercraft advances against wind. In this situation, the operator also operates the throttle so as to recover the speed that may be lost.

A combustion condition or oxygen ($O_2$) sensor 280 is provided that senses the in-cylinder combustion conditions by sensing the residual amount of oxygen in the combustion products at a time proximal to the opening of the exhaust port. This output and air fuel ratio signal is transmitted via a signal line 284 to the ECU 98.

There is also provided a pressure sensor 286 in series with the pressure regulator 218. This pressure sensor 286 outputs the high pressure fuel signal to the ECU 98 (signal line is omitted in FIG. 1).

There also may be provided a water temperature sensor 288 (see the lower right-hand view of FIG. 1) which outputs a cooling water temperature signal via a signal line 290 to the ECU 98. An engine cooling system which incorporates the sensor 288 will be described shortly.

Further, an intake air temperature sensor 292 (see the upper view of FIG. 1) is provided and this sensor 292 outputs an intake air temperature signal via a signal line 294 to the ECU 98.

Although several sensors are shown in FIG. 1, it is, of course, practicable to provide other and/or additional sensors such as an engine height sensor, a trim angle sensor, a knock sensor, a neutral sensor, a watercraft pitch sensor and an atmospheric temperature sensor, in accordance with various control strategies.

The ECU 98, as has been noted, outputs signals to the fuel injectors 117, spark plugs 114, the lubrication pumps 96 and the high pressure electric fuel pump 144 for their respective control. These control signals are carried by control lines 296, 298, 300 and 302, respectively, as indicated schematically in FIG. 1.

In addition, as seen in FIG. 2, a starter motor 308 for starting the engine 36, a tensioner 310 for giving tension to the belt 188, a flywheel 312 and a cover member 314 for covering the rotating components such as the high pressure fuel pump 148 are provided.

With reference again to FIG. 4 and additionally to FIGS. 6 through 11, an engine cooling system will now be described.

The cylinder block 50 has a cylinder block cooling jacket 332 which is formed generally to encircle each cylinder bore 54. The cylinder head member 68, in turn, has two jackets on front and rear sides. A cylinder head upstream cooling jacket 334 is formed at the front side, while a cylinder head downstream cooling jacket 336 is formed at the rear side. A gasket 338 is provided between the cylinder block 50 and the cylinder head member 68. Although the gasket 338 isolates the upstream jacket 334 from the cylinder block jacket 332, an aperture 340 is provided for allowing both of the jackets 332, 334 to communicate with each other.

Figure 6:
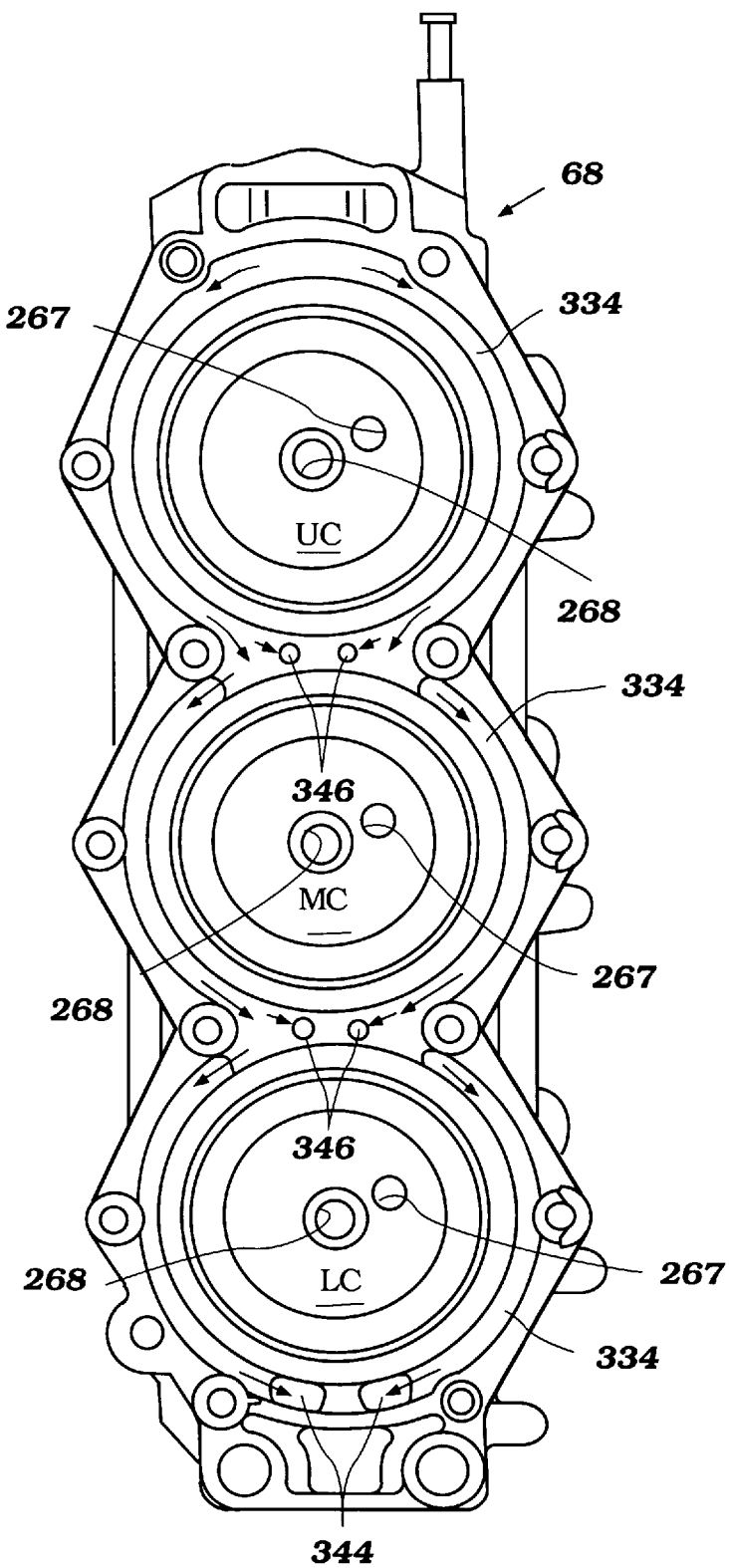
FIG. 6 is a front elevational view showing a cylinder head member on one bank of the engine and taken in the direction of the arrow 6 in FIG. 8. All other components are removed.

As best seen in FIG. 6, a pair of lower communication apertures 344 are formed at almost the bottom portion of the cylinder head member 68 to connect the upstream jacket 334 with the downstream jacket 336. The upstream jacket 334 and the downstream jacket 336 communicate with each other also through middle communication apertures 346 disposed between respective cylinder bores 54 (cylinder sections UC, MC and LC in FIG. 6).

The cylinder head cover member 76 has a cylinder head cover cooling jacket 348. Another gasket 349 is provided between the cylinder head member 68 and the cylinder head cover member 76. The cylinder head cover jacket 348 is completely isolated by this gasket 349.

Figure 7:
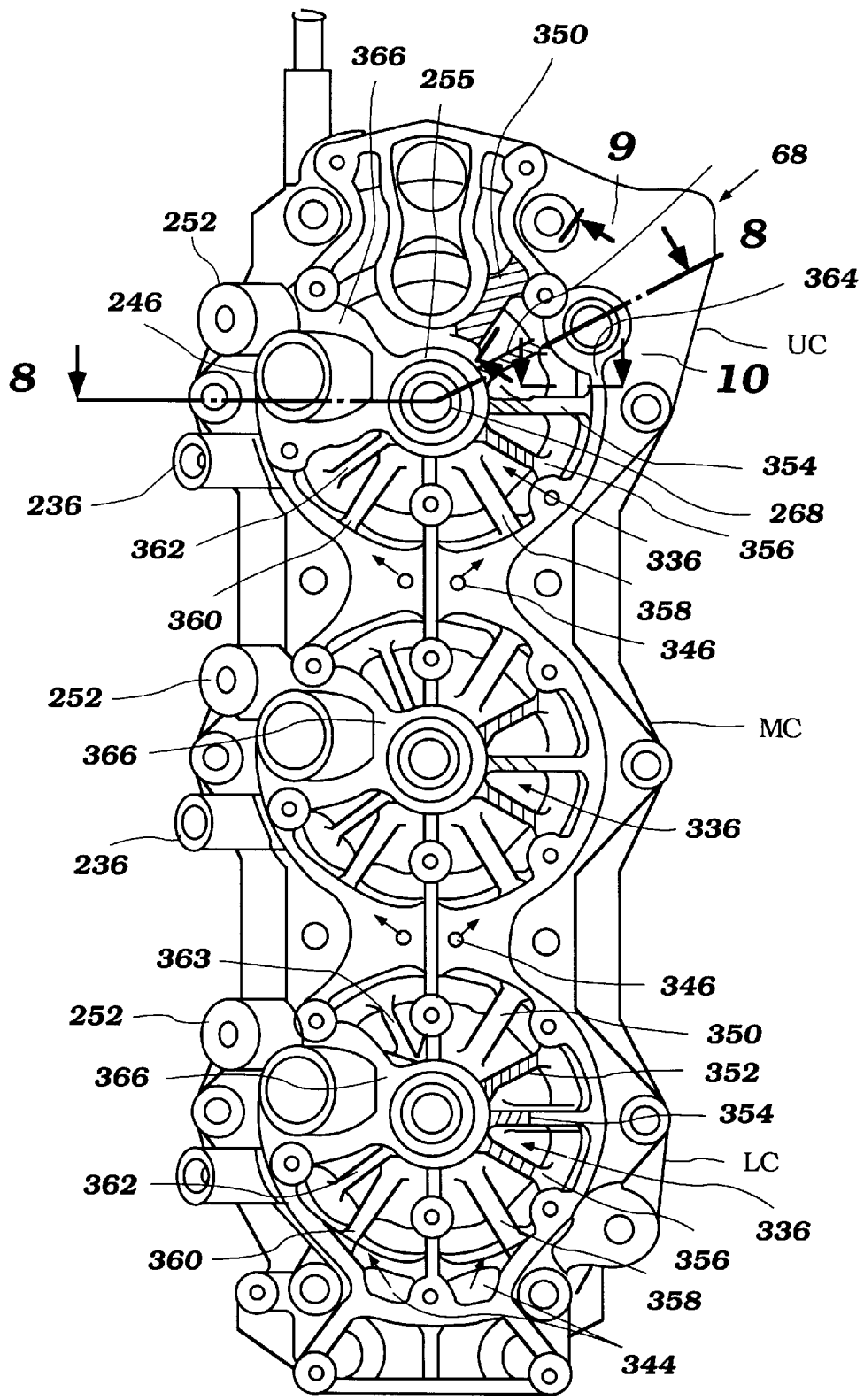
FIG. 7 is a rear elevational view showing the same cylinder head member taken in the direction of the arrow 7 in FIG. 8. All other components are removed also.
Figure 8:
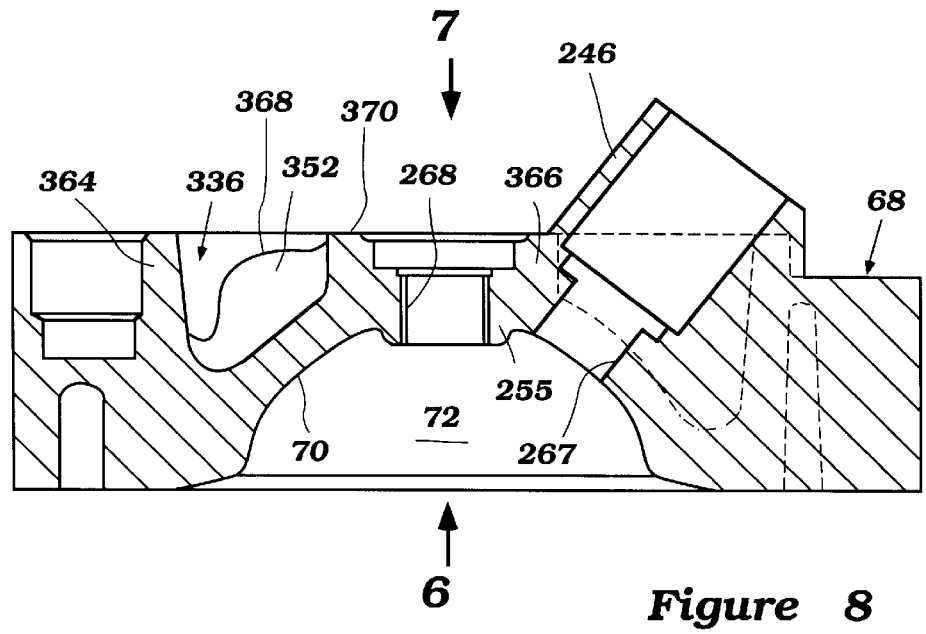
FIG. 8 is a cross-sectional side view showing the same cylinder head member taken along the line 8—8 in FIG. 7.
Figure 9:
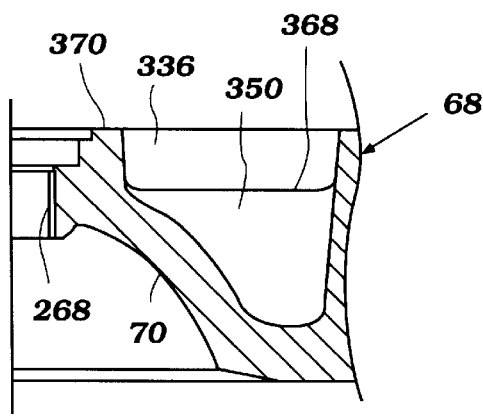
FIG. 9 is a partial cross-sectional side view showing the same cylinder head member taken along the line 9 in FIG. 7.
Figure 10:
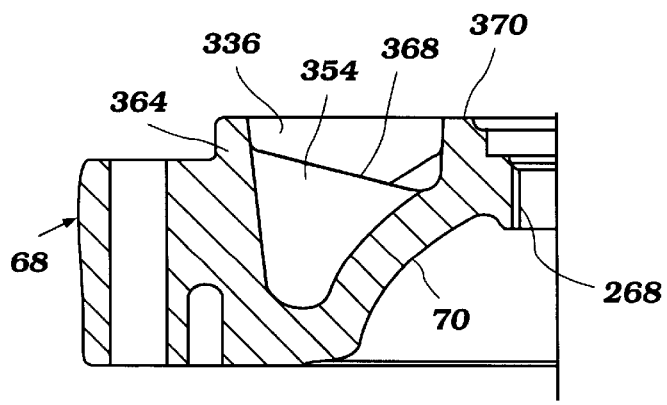
FIG. 10 is a partial cross-sectional side view showing the same cylinder head member taken along the line 10 in FIG. 7.

As best seen in FIG. 7, the cylinder head member 68 has several ribs 350, 352, 354, 356, 358, 360, 362, 363 at each respective cylinder sections UC, MC, LC. These ribs 350–363 extend radially from each plug boss 255 toward a peripheral bank portion 364. The injector boss 246 and the plug boss 255 are linked together with a rib portion 366. Since the rib portion 366 also extends radially from the plug boss 255 and reaches the peripheral bank portion 364 involving the injector boss 246, it forms an additional rib. Because respective tops 368 (see FIGS. 8 to 10) of the ribs 350–363 are lower than a top surface 370 of the cylinder head member 68, the downstream cooling jacket 336 is formed between the tops 368 of the ribs 350 to 363 and the gasket 349. Meanwhile, the rib portion 366 extends at least as far as the gasket 349 to block the downstream cooling jacket 336.

Figure 11:
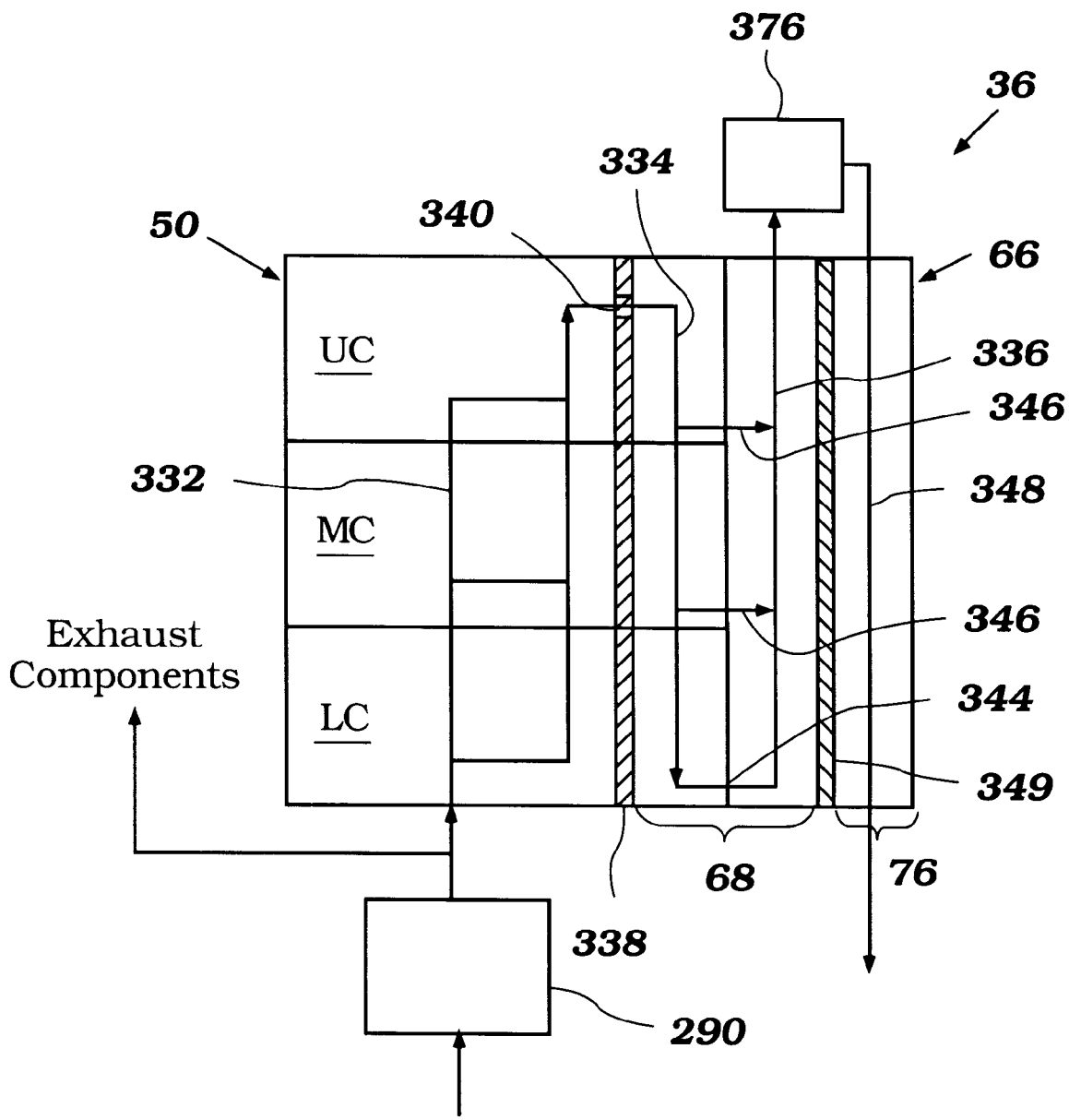
FIG. 11 is a schematic view showing a flow path of cooling water circulating through the engine.

As seen in FIG. 11, the cooling system includes a water pump 374 which introduces cooling water into the cooling system from the body of water surrounding the outboard motor 30. Some portion of this water is supplied to portions of the exhaust system to be used for cooling the exhaust system. The reminder of the water is supplied to the cylinder block cooling jacket 332 for cooling the cylinder block 50, specifically, the respective cylinder sections UC, MC and LC. The water thence flows into the cylinder head upstream jacket 334 through the aperture 340 of the gasket 338. From the upstream jacket 334, the water primarily flows into the cylinder head downstream jacket 336 through the lower communication apertures 344. Some of the water, however, flows into the downstream jacket 336 en route through the middle communication apertures 346. The water flowing through the cylinder head upstream jacket 334 and the downstream jacket 336 cools the cylinder head member 68.

The water then flows to a thermostat compartment 376, wherein a thermostat is disposed. The thermostat controls the water flow in the water passage formed in the compartment 376. That is, when water temperature is lower than a predetermined value, the thermostat closes the passage. When it is higher than the predetermined value, the thermostat opens the passage. The water passing through the passage in the thermostat compartment 376 flows to the cylinder head cover jacket 348 in the cylinder head cover member 76 for cooling this portion. Finally, the water is discharged to the surrounding body of water. The water temperature sensor 288 is located at a certain position downstream of the water pump 374 and in the engine 36.

With reference again to FIGS. 7 through 10, the ribs 350–363 and the rib portion 366 not only reinforce the cylinder head member 68 but also radiate (i.e., conduct) away heat from the cylinder head member 68, which was originally conducted from the combustion chamber. Particularly, the ribs 350, 352, 354 356, which positioned on almost the opposite side of the injector boss 246 and indicated with hatching in FIG. 7, are quite useful for the radiation of heat. Because, as described above, the fuel sprayed by the fuel injector 117 deprives heat for vaporization from the inner wall portion of the cylinder head member 68, at which the injector boss 246 is positioned, to cool down this portion. Therefore, this portion is cooled down rather than the opposite portion of the injector boss 246. The ribs 350, 352, 354, 356 are positioned on this opposite portion. The total surface area of these ribs 350, 352, 354, 356 are quite large and hence they can expedite the cooling effect on this portion.

Shapes, sizes and numbers of the respective ribs 350–363 depend on constructions of the cylinder head member 68, distributions of the heat and other various situations. The shapes and sizes of the ribs in this embodiment are different from each other. The shape of the rib 350 on the uppermost cylinder section UC is particularly different. Also, the rib 363 is omitted from this cylinder section UC. The ribs 350, 358, 360 are slightly larger than the others. Meanwhile, the ribs 362, 363 can be smaller than the others because they are positioned on the same side of the injection boss 246.

As described above, the engine has at least one rib on the generally opposite side of the fuel injector in the cooling jacket. Although the portion of the cylinder head member on this opposite side is likely to be heated to a greater degree than the side on which the fuel injector is located, it will be reduced by the rib or ribs disposed there. The temperature distribution of a cylinder head, therefore, will be more uniform to enhance the stability of the combustion state.

The features of the present invention are practicable in various types of engines such as, for example, engine of inboard/outboard drives and engines for automobiles.

Of course, the foregoing description is that of preferred embodiment of the invention, and various changes and modifications may be made without departing from the spirit and scope of the invention, as defined by the appended claims.

What is claimed is:

1. An internal combustion engine comprising a cylinder body defining a cylinder bore, the cylinder bore having a cylinder axis, a piston reciprocating within the cylinder bore generally along the cylinder axis, a cylinder head assembly closing an end of the cylinder bore and defining a combustion chamber with the cylinder bore and the piston, a fuel injector arranged to spray fuel directly into the combustion chamber, the cylinder head assembly including an injector boss disposed on a first side of the cylinder axis through which the fuel injector extends, the injector boss having a second axis slanting relative to the center axis so that an axis of fuel sprayed by the fuel injector is directed toward the cylinder axis, the cylinder head assembly defining a coolant jacket through which the injector boss extends, the cylinder head assembly further including a plurality of ribs distributed around the cylinder axis of the cylinder bore, wherein a greater number of ribs are disposed on a second side of the cylinder axis opposite the first side.

2. An internal combustion engine as set forth in claim 1, wherein said fuel injector blocks the flow of the coolant through the coolant jacket.

3. An internal combustion engine as set forth in claim 1, wherein the plurality of ribs are disposed generally radially on the cylinder head relative to an axis of the cylinder bore.

4. An internal combustion engine as set forth in claim 3, additionally comprising a spark plug arranged to ignite a fuel charge in the combustion chamber, the spark plug being disposed in a plug boss formed on the cylinder head, the plug boss being positioned at generally the center of the cylinder bore, and the plurality of ribs extending from the plug boss.

5. An internal combustion engine as set forth in claim 1, wherein the injector boss is disposed generally radially on the cylinder head relative to the cylinder axis of the cylinder bore.

6. An internal combustion engine as set forth in claim 5, additionally comprising a spark plug arranged to ignite a fuel charge in the combustion chamber, the spark plug being disposed in a plug boss formed on the cylinder head, the plug boss being positioned at generally the center of the cylinder bore, and both of the injector boss and the plug boss being connected with a portion of at least one of the plurality of ribs.

7. An internal combustion engine as set forth in claim 1, wherein the cylinder body includes an exhaust port through which a burnt charge is discharged from the combustion chamber, the exhaust port selectively communicates with the combustion chamber, and the fuel injector is disposed generally on the same side of the combustion chamber where the exhaust port is provided.

8. An internal combustion engine as set forth in claim 7, wherein the cylinder body additionally includes at least one scavenge port through which an air charge is introduced into the combustion chamber, and the scavenge port is positioned generally opposite of the exhaust port.

9. An internal combustion engine as set forth in claim 1, wherein the cylinder body includes at least one scavenge port through which an air charge is introduced into the combustion chamber, the scavenge port being disposed on the first side of the cylinder axis.

10. An internal combustion engine as set forth in claim 1, wherein the cylinder head comprises a cylinder head member and a cylinder head cover member disposed over the cylinder head member, and the cooling jacked exists between the cylinder head member and the cylinder head cover member.

11. An internal combustion engine as set forth in claim 10, wherein an isolation member is disposed between the cylinder head member and the cylinder head cover member, and the cooling jacket is defined between the cylinder head member and the isolation member.

12. An internal combustion engine as set forth in claim 1, wherein the engine operates on a two stroke crankcase compression principle.

13. An internal combustion engine as set forth in claim 1 in combination with a marine propulsion device additionally comprising an output shaft coupled to the marine propulsion device.

14. A direct fuel injected, internal combustion engine comprising a cylinder body defining at least one cylinder bore in which a piston reciprocates, a cylinder head member affixed to an end of the cylinder body for closing the cylinder bore and defining with the piston and the cylinder bore a combustion chamber, a fuel injector arranged to spray fuel directly into the combustion chamber, the fuel injector being disposed in a injector boss positioned on the cylinder head member, a cylinder head cover member defining a coolant passage with the cylinder head member therebetween, the fuel injector boss extending through the coolant passage, and a plurality of ribs projecting into the coolant passage from the cylinder head member, and one of the ribs extending from the injector boss.

15. A direct fuel injected, internal combustion engine as set forth in claim 14, wherein the ribs are disposed generally radially on the cylinder head member relative to an axis of the cylinder bore.

16. A direct fuel injected, internal combustion engine as set forth in claim 14, wherein the cylinder body includes an exhaust port through which a burnt charge is discharged from the combustion chamber, the exhaust port is capable to communicate with the combustion chamber, and the injector boss and the exhaust port generally are disposed on the same side of the combustion chamber.

17. A direct fuel injected, internal combustion engine as set forth in claim 14, wherein the cylinder body includes at least one scavenge port through which an air charge is introduced into the combustion chamber, and a portion of the cylinder head at which the injector boss is positioned generally confronts the scavenge port.

18. A direct fuel injected, internal combustion engine as set forth in claim 14, wherein at least two ribs are disposed generally on an opposite side of the rib extending from the injector boss.

* * * * *